United States Patent
Tsybrovskyy et al.

(10) Patent No.: US 10,607,026 B2
(45) Date of Patent: Mar. 31, 2020

(54) SYSTEM AND METHOD FOR DATA BACKUP USING UNMANNED AERIAL VEHICLE (UAV)

(71) Applicant: Acronis International GmbH, Schaffhausen (CH)

(72) Inventors: Yuriy Tsybrovskyy, Burlington, MA (US); Stanislav S. Protasov, Moscow (RU); Serguei M. Beloussov, Costa Del Sol (SG); Mark Shmulevich, Moscow (RU)

(73) Assignee: Acronis International GmbH, Schaffhausen (CH)

( * ) Notice: Subject to any disclaimer, the term of this patent is extended or adjusted under 35 U.S.C. 154(b) by 262 days.

(21) Appl. No.: 15/464,449

(22) Filed: Mar. 21, 2017

(65) Prior Publication Data
US 2017/0270314 A1 Sep. 21, 2017

Related U.S. Application Data

(60) Provisional application No. 62/310,887, filed on Mar. 21, 2016.

(51) Int. Cl.
| | |
|---|---|
| *G06F 21/62* | (2013.01) |
| *G06F 21/60* | (2013.01) |
| *H04W 12/08* | (2009.01) |
| *H04N 7/18* | (2006.01) |
| *B64C 39/02* | (2006.01) |
| *B64D 1/22* | (2006.01) |
| *H04W 12/02* | (2009.01) |
| *H04W 12/06* | (2009.01) |

(Continued)

(52) U.S. Cl.
CPC ........ *G06F 21/6227* (2013.01); *B64C 39/024* (2013.01); *B64D 1/22* (2013.01); *G06F 11/1415* (2013.01); *G06F 16/24561* (2019.01); *G06F 21/602* (2013.01); *H04L 67/12* (2013.01); *H04N 7/185* (2013.01); *H04W 12/02* (2013.01); *H04W 12/08* (2013.01); *B64C 2201/12* (2013.01); *B64C 2201/122* (2013.01); *B64C 2201/128* (2013.01); *H04L 63/0861* (2013.01); *H04W 12/06* (2013.01)

(58) Field of Classification Search
USPC .......................................................... 726/4
See application file for complete search history.

(56) References Cited

U.S. PATENT DOCUMENTS 9,454,157 B1 * 9/2016 Hafeez .................. G05D 1/104
9,858,824 B1 * 1/2018 Zogg .................... G08G 5/0034
(Continued)

FOREIGN PATENT DOCUMENTS

CN 104950906 A * 9/2015

*Primary Examiner* — Harunur Rashid
*Assistant Examiner* — Sakinah White Taylor
(74) *Attorney, Agent, or Firm* — Arent Fox LLP; Michael Fainberg

(57) ABSTRACT

Disclosed are systems, methods and computer program products for performing data backup using an unmanned aerial vehicle (UAV). An example method includes in response to detecting a data backup request from a user device, determining a geographic location of the user device and dispatching the UAV to the geographic location; controlling the UAV to obtain user data from the user device; and controlling the UAV to navigate to a data center to back up the obtained user data onto a cloud storage.

18 Claims, 4 Drawing Sheets

(51) Int. Cl.
*G06F 11/14* (2006.01)
*G06F 16/2455* (2019.01)
*H04L 29/08* (2006.01)
*H04L 29/06* (2006.01)

(56) References Cited

U.S. PATENT DOCUMENTS

| | | | |
|---|---|---|---|
| 10,145,684 B1* | 12/2018 | Tofte | G06Q 40/08 |
| 2004/0008253 A1* | 1/2004 | Monroe | G08B 13/19641 |
| | | | 348/143 |
| 2011/0296127 A1* | 12/2011 | Agombar | G06F 11/1448 |
| | | | 711/162 |
| 2015/0230150 A1* | 8/2015 | Wang | H04B 7/18506 |
| | | | 370/252 |
| 2015/0344136 A1* | 12/2015 | Dahlstrom | B64C 39/024 |
| | | | 701/3 |
| 2016/0070261 A1* | 3/2016 | Heilman | G08G 5/0013 |
| | | | 701/2 |
| 2016/0200437 A1* | 7/2016 | Ryan | B64C 39/022 |
| | | | 244/99.2 |
| 2016/0205724 A1* | 7/2016 | Shi | H04B 7/18506 |
| | | | 370/254 |
| 2016/0246297 A1* | 8/2016 | Song | G05D 1/0022 |
| 2016/0357183 A1* | 12/2016 | Shaw | G05D 1/0027 |
| 2017/0011333 A1* | 1/2017 | Greiner | G06Q 10/083 |
| 2017/0023947 A1* | 1/2017 | McMillion | B64D 1/22 |
| 2017/0075765 A1* | 3/2017 | Chen | G06F 11/1464 |

* cited by examiner

SYSTEM AND METHOD FOR DATA BACKUP USING UNMANNED AERIAL VEHICLE (UAV)

CROSS-REFERENCES TO RELATED APPLICATIONS

This application claims the benefit of U.S. Provisional Application No. 62/310,887, filed Mar. 21, 2016, the content of which are hereby incorporated by reference.

TECHNICAL FIELD

The disclosure relates generally to the field of data backup, and more specifically to the systems, methods and computer program products for data backup using unmanned aerial vehicles (UAVs).

BACKGROUND

As a wide variety of computing devices become more prevalent and widely used among the general population, the amount of electronic data generated and utilized by such devices has rapidly increased. Network-based backup services have been implemented to allow a user to backup various data stored on a computing device at a remote location on a network. Among these network-based data backup systems, cloud storage is a model of data storage in which electronic data is stored in logical pools, the physical storage spans multiple servers (and often locations), and the physical environment is typically owned and managed by various cloud storage providers who are responsible for keeping the data available and accessible, and the physical environment protected and running. Individual users, enterprises, and organizations buy or lease storage capacity from these storage providers to store user, organization, or application data.

While home and office cloud upload speeds continue to grow, so does the size of a user data backup. This problem may be especially pronounced in the consumer segment, where an available broadband connection is often slow and congested. In some instances, the broadband connection speed for data download may be acceptable and satisfactory to some individual consumers, but data upload speed can be generally slow in, e.g., densely populated urban areas with slow broadband services, as consumers may have huge amounts of photos and videos they want to back up to a remote data cloud.

Therefore, there is a need for faster consumer data backup to a remote data cloud for users with generally slow broadband services.

SUMMARY

Disclosed are systems, methods and computer program products for performing data backup using an unmanned aerial vehicle (UAV), i.e., drone. One of the advantages of the disclosed technique is to use alternative ways such as UAVs/drones for delivering initial set of data (drone data seeding), and using broadband for subsequent data updates, which is much more manageable in size.

In the context of a cloud-based data storage network environment, after installing a cloud backup provider's software on a computing device, a user of the computing device may start backing up data to the cloud service. As discussed above, transferring a sizable amount of data to a remote data cloud may be very time consuming subject to the available quality and bandwidth of the available broadband available to the user. To reduce the time required for such sizable user data backup operations involving a remote cloud storage, the present application discloses a drone data seeding mechanism in which a backup service provider sends a UAV to the user's location for the purpose of receiving and transporting user's data to a remote data center for backup. In one exemplary aspect, a user may store his data on a portable data storage media, such as flash drive, and send this data storage media via the provided UAV to a backup service provider for offloading the data into a designated cloud storage. In another exemplary aspect, instead of using portable data storage media, the user may upload data for backup to the UAV's onboard data storage, e.g., hard disk drive, using a broadband wireless connection between user's computer and the UAV. The user's data is then offloaded from the UAV's onboard data storage to the cloud storage. That is, a customer's data is copied to the cloud provider's servers, "seeding" the customer's initial full backup. Once this process has been accomplished, a customer's computing device only has to back up using conventional methods blocks of data that have changed since the initial seed was completed.

In one exemplary aspect, a method for performing data backup using to a data center includes: in response to detecting a data backup request from a user device, determining a geographic location of the user device and dispatching an unmanned aerial vehicle (UAV) to the geographic location; controlling the UAV to obtain user data from the user device; and controlling the UAV to navigate to the data center to back up the obtained user data onto a cloud storage.

In some exemplary aspects, controlling the UAV to obtain user data includes one of: storing the user data on a portable data storage media; and uploading the user data onto internal data storage of the UAV using a wireless network connection between the user device and the UAV.

In some exemplary aspects, controlling the UAV to obtain user data includes: compressing and encrypting the user data.

In some exemplary aspects, controlling the UAV to obtain the user data includes: determining flying trajectory and path for the UAV in connection with the geographic location, controlling a landing of the UAV by hovering the UAV at a selected altitude above the geographic location; and controlling a winch of the UAV for access to the user device located below the UAV.

In some exemplary aspects, controlling the UAV to obtain the user data includes using at least one vehicle for transporting the UAV towards the geographic location; and launching the UAV from the at least one vehicle responsive to the at least one vehicle reaching a defined range of the geographic location.

In some exemplary aspects, the method further includes generating an alert on a selected user device for indicating the UAV approaching the geographic location.

In some exemplary aspects, the method further includes generating a guidance target with a barcode to guide the UAV to the geographic location.

In some exemplary aspects, the determining the geographic location of the user device and dispatching an unmanned aerial vehicle (UAV) to the geographic location includes determining a network connectivity metric between the user device and the data center; and dispatching the UAV responsive to determining the network connectivity metric between the user device and the data center does not meet a threshold connectivity.

In some exemplary aspects, the method further includes directing the UAV to destroy the obtained user data responsive to detecting at least one of unauthorized access to the UAV or electromechanical failure of the UAV.

In some exemplary aspects, the UAV comprises a sequence of UAVs, and wherein controlling the UAV to navigate to the data center to back up the obtained user data onto the cloud storage comprises: controlling one UAV in the sequence of UAVs to transfer the obtained user data to a next UAV in the sequence of UAVs in a sequential manner, until a last UAV in the sequence of UAVs transfers the obtained user data to the data center.

The above simplified summary of example aspects serves to provide a basic understanding of the invention. This summary is not an extensive overview of all contemplated aspects, and is intended to neither identify key or critical elements of all aspects nor delineate the scope of any or all aspects of the invention. Its sole purpose is to present one or more aspects in a simplified form as a prelude to the more detailed description of the invention that follows. To the accomplishment of the foregoing, the one or more aspects of the invention include the features described and particularly pointed out in the claims.

BRIEF DESCRIPTION OF THE DRAWINGS

The accompanying drawings, which are incorporated into and constitute a part of this specification, illustrate one or more example aspects of the invention and, together with the detailed description, serve to explain their principles and implementations.

DETAILED DESCRIPTION

Figure 1:
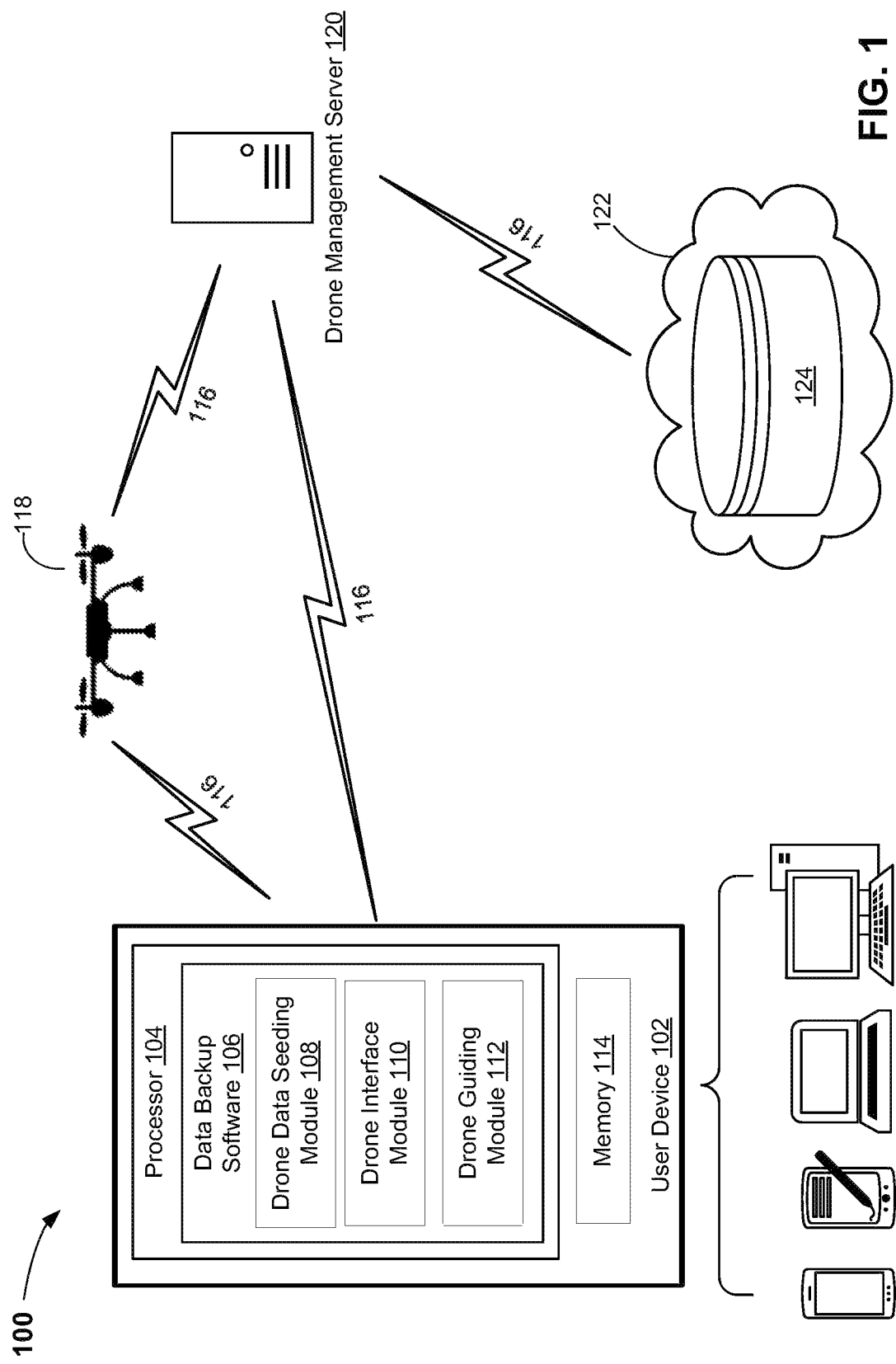
FIG. 1 illustrates a system for performing data backup using an UAV according to an exemplary aspect.

Example aspects of the present invention are described herein in the context of systems, methods and computer program products for performing data backup to a remote data cloud using an UAV. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same items.

UAVs, also known as drones, have been extensively used for various information gathering projects or purposes. In the remainder of this disclosure, the term drone refers to both drones and UAVs for brevity. Commercial applications of drones may include package delivery systems, video gathering systems, and a platform for communications. Since drones usually fly at much lower altitudes than satellites do, drone systems do not need the expensive space qualification, development and maintenance cost of conventional satellite systems. Drones also do not need expensive launch systems.

Another advantage of drones over satellite systems is the low delay of drone systems. For instance, geo-stationary satellites have a round trip delay from ground to the satellite and back to ground of about 0.5 seconds which significantly impacts the quality of services that require a low round trip delay. By contrast, even high altitude drones, at, e.g., altitudes of 25 kilometers, may have a round trip delay of 2 msec or so to terminals on the ground that may be 300 kilometers away from the drones. Low delay of drone based system allows similar real time quality as terrestrial systems broadband access systems do. Furthermore, the data transfer rate from a client to a satellite is typically many times slower than the transfer rate from the satellite to a client, thereby making data transfer via drones a more efficient means than using satellites.

Another major advantage of drones is that they can be deployed one at a time in areas with radius of 300 km or less and immediately provide service to the drone's footprint. Whereas satellite systems need to cover a wide area such as a large part of continental US in the case of geo-satellite systems, or most of the earth in the case of LEO (Low Earth Orbit) satellite systems before service may be provided. Therefore, drone based systems scale well as one can send one drone and start service in its footprint, test the market acceptance of the service, and send more drones in areas that need service. Moreover, putting the importance and complexity of drones hardware design aside, drone operations may be primarily controlled by software, therefore, in avoiding using automation which typically involves high human-related costs, the drone operations themselves are much economic.

FIG. 1 illustrates a drone data seeding system 100 for user data backup at a remote cloud storage according to an exemplary aspect. As shown, a user device 102 may include at least one hardware processor 104 (e.g., a central processing unit 21 of FIG. 4) controlling and executing a data backup software 106 for backing up various digital user data (e.g., text documents, images, video/audio, executable files, etc.) stored in memory 114 of the user device 102 to a remote cloud storage 124 of a data cloud 122. The user device 102 may be one of personal computers, servers, laptops, tables, mobile devices, smart phones, cellular devices, portable gaming devices, media players or any other suitable devices that can retain, manipulate and transfer data. The memory 114 may be any type of device for storing digital information such as a hard drive, flash memory, disk, or tape.

It is to be appreciated that the system 100 may include any suitable and/or necessary interface components (not shown), which provide various adapters, connectors, channels, communication paths, to facilitate exchanging signals and data between various hardware and software components of the user device 102 and any applications, peer devices, remote or local server systems/service providers, additional database system(s), and/or with one another that are available on or connected via an underlying network 116.

According to the exemplary aspects disclosed herein, the data backup software 106 may be purchased from a store and/or downloaded and installed on the user device 120. The software 106 is configured to perform a backup of data stored in the memory 114 using various methods one of which via at least one drone 118 controlled by a drone management server 120 to a data center having a remote storage device, such as in a data cloud 122, and ultimately stored in a designated data backup archive of a cloud storage

124 of the data cloud 122. It is to be appreciated that the cloud storage 124 may include any suitable component, device, hardware, and/or software. The remote data cloud 122 may refer to any collection of resources (e.g., hardware, software, combination thereof, etc.) that are maintained by a party (e.g., off-site, on-site, third party), and accessible by one or more user devices 102 over the network 116 (e.g., Internet, wireless, LAN, cellular, Wi-Fi, WAN). Such data cloud 122 and the associated cloud storage 124 may provide any service, network service, cloud service, collection of resources, and can be accessed by one or more user devices 102 via the network 112.

As shown in FIG. 1, the data backup software 106 may comprise a drone data seeding module 108, a drone interface module 110, and a drone guiding module 112. According to the exemplary aspect, after launching the data backup software 106 on the user device 102, a user of the user device 102 may select, e.g., a "send me a drone" option, and enter an address such as a residential or business street address in the drone interface module 110 for receiving the drone 118. In another exemplary aspect, the drone data seeding module 108 may use geolocation service or components of the user device 102 (e.g. GPS module) to identify current location of the user device 102. In response to the "send me a drone" option being activated, the drone data seeding module 108 may be configured to use the available communication channels and protocols associated with the underlying network 116 to connect with a remote drone management server 120.

In some exemplary aspects, the user of the user device 102 may select a data backup option (e.g., "back up data now"), and the drone seeding module 108 and the drone management server 120 may be configured to assess network connectivity between the user device 102 and the cloud storage 122 to determine whether to transmit the initial backup using available communication channels associated with an underlying network 116 or via drone 118. In some exemplary aspects, the drone management server 120 may select using drones 118 on the basis of the location of the user device 102. For example, the drone management server 102 may select using drones 118 if the user device 102 is determined to not have a permanent connection with the data center, e.g., the user device 102 changes its position often.

It should be appreciated that the drone data seeding module 108 may be configured to establish communications with other entities such as the drone 118 and the drone management server 120 by employing suitable security and/or encryption methods to secure such communications using the available communications channels and protocols associated with the underlying network 116. For example, Wireless Encryption Protocol (WEP) (also called "Wired Equivalent Privacy) is a security protocol for WiLANs defined in the IEEE 802.11b standard. WEP is cryptographic privacy algorithm, based on the Rivest Cipher 4 (RC4) encryption engine, used to provide confidentiality for 802.11b wireless data. RC4 may accept encryption keys of arbitrary length, and is essentially a pseudo random number generator with an output of the generator being XORed with a data stream to produce encrypted data.

Further, another security upgrade for the 802.11 standard called "802.11i" may also be used for improving WiLAN security in facilitating the encrypted transmission of data between systems 802.11x WiLANs. 802.11i standard also defines new encryption key protocols including the Temporal Key Integrity Protocol (TKIP) based on 802.1x port-based authentication for user and device authentication. The 802.11i standard includes two main developments: Wireless or Wi-Fi Protected Access (WPA) and Robust Security Network (RSN). WPA may use the same RC4 underlying encryption algorithm as WEP. However, WPA uses TKIP to improve security of keys used with WEP. WPA keys are derived and rotated more often than WEP keys and thus provide additional security. WPA also adds a message-integrity-check function to prevent packet forgeries. On the other hand, RSN may use dynamic negotiation of authentication and selectable encryption algorithms between wireless access points and wireless devices. The authentication schemes may include Extensible Authentication Protocol (EAP), and the encryption algorithm may include an Advanced Encryption Standard (AES) encryption algorithm. Dynamic negotiation of authentication and encryption algorithms may allow RSN to evolve with the state of the art in security, adding algorithms to address new threats and continuing to provide the security necessary to protect information that WiLANs carry. RSA is a public key encryption system which can be used both for encrypting messages and making digital signatures.

Additionally, "hashing," which is also used many encryption algorithms, refers to the transformation of a string of characters into a usually shorter fixed-length value or key that represents the original string. Hashing may be used to index and retrieve items in a database because it is faster to find the item using the shorter hashed key than to find it using the original value.

In some aspects, the drone management server 120 may be configured to control various operations of one or more drones 118 simultaneously in real time including but not limited to, e.g., initiating the deployment of the drone 118, providing flight control data to the drone 118, controlling the flight of the drone 118, controlling a position optimization, and initiating a landing procedure of the drone 118. In some exemplary aspects, the drone management server 120 may monitor the battery status of the drone 118 continuously or at a scheduled basis and correspondingly activating appropriate signals to modify operations of the drone 118 to conserve battery power, or in response to low battery or any detected emergency situations. Alternatively, the drone management server 120 may be arranged and implemented in the drone 118 itself at a ground carrier that may serve as landing pad and charging station for the drone 118, or anywhere in the network 116. Furthermore, the drone management server 120 may be implemented in any network node including but not limited to, e.g., a standard base station, a backhaul node, or a network node of a core network (not shown).

In some exemplary aspects, the drone management server 120 may be configured to provide a user interface (UI) to an administrator that displays a variety of information related to the drones 118 and enables the administrator to modify the drones, including such information as the status of drones 118, the drones' location at a given moment, the drones' past locations (i.e., past flight path), the drones' projected locations in the future (i.e., projected flight path), the condition of the drones' batteries (e.g., charged, uncharged), and memory storage status (e.g., empty or loaded with data).

The user may additionally use the drone guiding module 112 to obtain or print out a guidance target with a barcode including but not limited to, e.g., Quick Response (QR) code, Aztec code, or similar, that may be used by the drone 118 to guide itself to a precise landing location corresponding to the street address entered via the drone interface module 110 by the user. In one aspect, the user may use the drone interface module 110 to select any user device such as his/her smart phone via the drone interface module 110 for generating and receiving an alert signal which indicates that the drone 118 approaches the user defined landing location within a user selected range (e.g., within 50-100 meters or within 5-10 minutes). Upon receiving such alert signal, the user may arrive at the specified landing location and put the data media on a suitable landing surface. After the drone 118 lands on such landing surface, the data media may be either manually or automatically loaded into its cargo bay, and the drone 118 may return to a data center for offloading the user data stored in the data media to the cloud storage 124. Alternatively, a winch may be implemented on the drone 118 and the winch may be lowered after the landing of the drone to attach the date media.

In one exemplary aspect, the data backup software 106 may store all or portion of data from the memory 114 into a portable data storage media, e.g., MicroSD™ card or any suitable data media, which is manually placed by the user into the drone 118. For example, a 128 GB MicroSD™ card may weigh 0.4 g (+/−0.1 g), and a 2 kg drone net payload may be therefore 5000 MicroSD™ cards, or 600 TB or so of formatted capacity. Assuming a drone roundtrip of 30 minutes, a user may achieve an upload speed of approximately 350 GB per second. Even if a user is sending just one TB of data on a 60 minutes' roundtrip, it is still 280 MB per second, or 2.2 Gbit per second. Further, as another example, common data rate for external storage may be 40 MB per second, so uploading one TB to a data media may take 7 hours according to aspects of the subject application. Assuming further the download speed is substantially the same as the upload speed, a total roundtrip may become 15 hours, and an end-to-end bandwidth may become 150 Mbps. For some countries, this data upload speed may be a significant improvement (e.g., a factor of 100× faster) over a current DSL speed which is typically 6-20 Mbps for the download speed, and 1.5 Mbps for the upload speed.

In another example, the data backup software 106 may establish a wireless network connection 116 between the user's computing device 102 and the drone 118 and use this connection to upload the user's data to the drone's internal data storage, e.g., hard disk drive. The wireless network connection 116 may include a Wi-Fi, Bluetooth, WiGig (Wireless Gigabit Alliance), Li-Fi (Light Fidelity) or other high-speed, broadband radio connection. Particularly, when the drone 118 approaches or arrives at the specified address as indicated by the drone guiding module 112, the user may test the available wireless data connection 116 between the selected user device 102 and the drone 118 via the drone data seeding module 108. Availability of one or more direct wireless data connections 116 may be presented in the drone interface module 110 in, e.g., a descending order from the strongest signal strength to the weakest. In one aspect, the drone data seeding module 108 may evaluate the user data saved locally on the user device 102 which are ready for uploading in terms of the data size, type and permissible data speed of the available data connections detected, and accordingly make recommendations with respect to which connection may be used for such data uploading. The user data may then be uploaded to the internal data storage or memory of drone 118.

According to another exemplary aspect, a proprietary portable data storage media may be designed and provided to each user by the backup service provider within the backup software package or with the drone 118.

In one exemplary aspect, the drone data seeding module 108 and the drone interface module 110 may also employ suitable standard or proprietary data compression schemes and techniques in dealing with various user data without adversely affecting the quality of such user data. Particularly, the data backup software 106 may compress and/or encrypt user data before storing it on the portable data storage media or uploading it wirelessly to the drone 118. The compression and/or encryption of user data ensures security of user data even in situations if the drone 118 is lost or damaged en route to the data center to the extent no data can be retrieved, the security of the user data will not be compromised. In one example, the drone 118 may also be configured to have self-destruction functions for the built-in memory such that the user data may be completely destroyed after a defined period of time. In some exemplary aspects, the drone 118 may be configured to destroy user data according on a defined data protection policy. In this context, user data can be characterized as neutral or sensitive. As such, depending on the defined data protection policy, the drone 118 may destroy user data in case of any unauthorized users attempt to get access to the user data, e.g., if a drone 118 is damaged or captured. As such, if an authorized user tries to copy or to read the user data without special permissions, the drone may destroy the user data contained within.

To improve user experience, the drone interface module 110 may be configured to create and transmit alerts responsive to the drone guiding module 112 detecting and/or classifying the drone 118 dispatched to a specific user. For example, the drone interface module 110 may create and present an alert based on preferences by the user by, e.g., displaying a flight path and/or graphical representation of the drone 118 detection in relation to a map. The drone interface module 110 may further transmit a message indicative of the end of the drone detection process.

As discussed, the drone interface module 110 may be configured to create an alert signal on any device specified by the user, such as activating/deactivating a light source, an audio source, and/or a switch associated with the device. The drone guiding module 112 may also queue detections and corresponding detection information for transmission to the drone management server 120. Moreover, the drone guiding module 112 may be configured to store to a data structure in the memory 114 each detection incident including, for example, a time, date, duration, and location of the detection. The data structure may include drone classification information such as the drone identifier, class, brand, and model.

Figure 2:
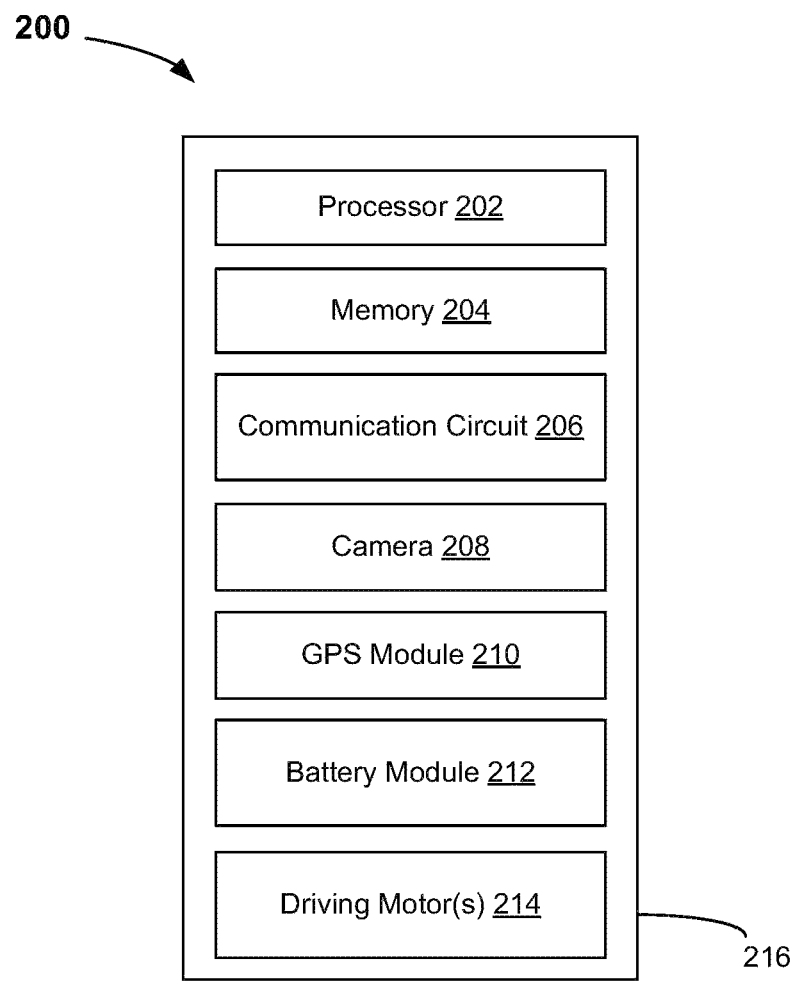
FIG. 2 illustrates an example drone for performing data backup according to an exemplary aspect.

FIG. 2 illustrates an example drone 200 in accordance with aspects of the application. The drone 200, corresponding to the drone 118 in FIG. 1, may comprise a housing 216, which may enclose one or more compartments (not shown) for storing objects such as the data media discussed above, a processor 202, a memory unit 204, a communication circuit 206, a camera 208, and a GPS module 210, a battery module 212, and one or more driving motors 214.

In one aspect, the battery module 212 may be controlled and executed by the processor 202 to provide energy to the one or more driving motors 214. The battery 212 may be charged externally, or using one or more solar cells disposed on an outer surface of the housing 216. The solar cells may be electrically connected to a battery of the drone 200 and may be configured to charge the battery. Alternatively, the drone 200 may be charged wirelessly using a wireless charger accessory (not shown).

Although not explicitly shown, the one or more compartments of the drone 200 may include suitable access, authorization, and security mechanisms for objects stored therein. For example, the drone 200 may comprise one or more biometric sensors to sense biometric parameters of a specific user. The sensed biometric parameters may be compared to reference biometric parameters of the user stored in the memory 204 of the drone 200 to recognize the user. Additionally, access to the drone 200 may be controlled by a password, a Personal Identification Number (PIN) code, biometric authorization, and so forth. The biometric authorization may include fingerprint scanning, palm scanning, face scanning, and retina scanning using the one or more biometric sensors and/or the camera 208. In one example, the camera 208 may be disposed in the compartment and communicatively coupled to the processor 202 and memory 204.

The camera 208 may be configured to scan one or more barcodes, as discussed above. Barcodes captured by the camera 208 may be processed by the processor 202 to retrieve information including but not limited to street barcodes encoding data on street name and/or geographical location, and so forth. In some exemplary aspects, the camera 208 may be configured to capture imagery of a guidance target with one or more barcodes, as discussed above. In one exemplary aspect, the camera 208 may be configured to capture the drone's surroundings and provide visual imagery to the drone management server 120 and/or the user device 102.

The processor 202 may be configured to control movement and navigation of the drone 200 based on information relating to geographical location of the drone 200 and its itinerary data obtained via, e.g., the GPS module 210 which is configured to track the geographical location of the drone 200.

The communication circuit 206 may include one or more of the following: a Bluetooth module, a Wi-Fi module, a communication port, including a universal serial bus (USB) port, a parallel port, an infrared transceiver port, a radiofrequency transceiver port, and suitable antennas and transceivers. In some aspects, the communication circuit 206 may include a touch screen with user selectable options configured to enable user interaction with the drone 200. Various control elements for controlling operations or functions of the drone 200 may also be implemented including buttons, switches, and keys.

Additionally, the drone 200 may comprise a microphone (not shown) to sense voice data. The voice data may include a voice command, a voice memo, a voice message. The voice data may be processed by the processor 202, stored to the memory 204, and/or reproduced when necessary (e.g., at the data center) using an audio reproduction element (e.g., a speaker). In some aspects, the drone 200 may be further configured to download, install, and run applications, receive and send text, video, multimedia data, and perform other operations.

According to yet another exemplary aspect, it may be advantageous to use one or more often-larger, base vehicles (e.g., aircraft, landcraft, or watercraft) as a "mother ship" which may be configured to launch small drones for a final mile delivery. This approach may help mitigate various problems relating to limited delivery ranges achievable by drones, limited battery power and payload size of drones, and difficulties in avoiding obstacles at lower altitudes and finding suitable site for landing. Such a mother ship may be readily integrated with existing courier/mail services to deliver data within a short period of time in populated areas or overnight in more remote locations. Moreover, existing logistics organizations, such as Uber®, Lyft®, Postmates®, DoorDash®, usually have mobile apps to track progress and may be integrated into the drone data seeding systems and methods disclosed herein.

Further, landing in urban or wooded areas may be problematic for drones, especially when considering vortex ring effects and wind. According to one exemplary aspect, the drone 200 may include a mechanical device (e.g., a winch) configured to pull in or let out a rope or cable coupled to data media. As such, the drone may be configured to hover well above ground and the winch to raise/lower data media for ground access. In some exemplary aspects, the winch device may be operatively coupled to the drone's cargo bay (e.g., container, bin) that is lowered to a user, who in turn, manually loads a portable storage media into the container. In some exemplary aspects, the winch device may be configured to automatically retrieve the portable storage media from the drone's elevated position and automatically place the portable storage media within the drone's cargo bay.

To avoid collisions with obstacles and other flying drones, the drone management server 120 may be configured to determine a flying path or trajectory of each drone based on obtained GPS information of a specific service area and/or each drone, and define a predetermined 2D or 3D zone around each flying drone. Such a predetermined zone may correspond to a security zone and allow performing security tests and/or security checks concerning potential collisions among the drones or other obstacles.

While FIGS. 1 and 2 illustrates one exemplary aspect that uses a single drone 118 to transfer user data between a user device 102 and a data center, it is understood that a fleet or "swarm" can be used, for example, to build a chain of several drones. In some exemplary aspects, a chain of drones 118 can be used as a kind of temporary network connection to obtain data from difficult geographical locations. In this exemplary aspect, the drone management server 120 is configured to locate multiple drones one by one and moves the drones 118 to within a distance that allows the drones 118 to receive data from the closest drone to the user and transferred to a next drone in the chain. This exemplary aspect, in which the drones 118 work as data re-transmitters, can be used in cases in which storage of the full user data directly on the drones is not desired.

Figure 3:
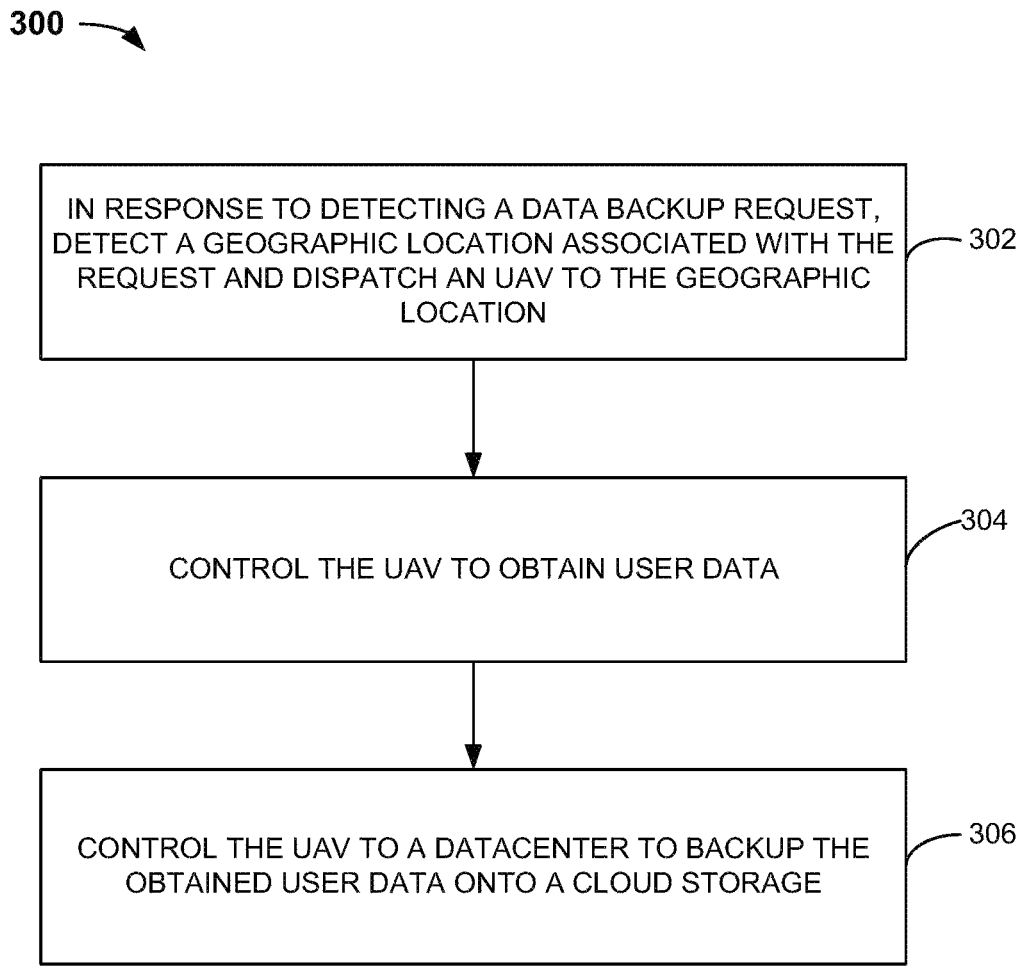
FIG. 3 illustrates an example a method for performing data backup using an UAV according to an exemplary aspect.

FIG. 3 illustrates a method 300 for performing data backup using an UAV, according to exemplary aspects of the present invention. Initially at step 302, the drone management server 120 may, in response to detecting a data backup request, detect a geographic location associated with the request by a hardware processor and dispatching the UAV to the geographic location. In some exemplary aspects, the drone management server 120 may determine a network connectivity metric between the user device and the data center, and dispatch the UAV responsive to determining that the network connectivity metric does not meet a threshold connectivity. For example, the drone management server 120 may calculate network connectivity metrics, such as network bandwidth, latency, and possible transfer rates, between the user data 102 and the data center. If the metrics fail to meet a predefined threshold (e.g., transfer rate of less than 1 Mbps, or latency of 100 msecs), the drone management server 120 may then select a drone 118, rather than data transfer using conventional communication channels established between the user device and the data center.

Next, at step 304, the drone management server 120 may control the UAV to obtain user data deposited on a data media or via a wireless data connection between the user device and the UAV. In some exemplary aspects, the drone management server 120 may determine flying trajectory and path for the UAV in connection with the geographic location, and control a landing of the UAV by hovering the UAV at a selected altitude above the geographical location. In such aspects, the drone management server 120 may further control a winch device of the UAV for access to the user device located below the UAV. For example, the drone management server 120 may direct the UAV to operate its winch device to lower a basket down to the user at the target geographical location and, having secured a portable storage media in the basket from the user, operate the winch device again to raise the basket and retain the portable storage media in the UAV.

According to some exemplary aspects, sometimes during operation, the drone 118 can be damaged, suffer electromechanical failure, or be physically accessed by unauthorized users. In some exemplary aspects, responsive to detecting unauthorized access to the UAV or electromechanical failure, the drone management server 120 can direct the UAV to destroy obtained user data contained within. For example, the UAV may securely wipe the UAV's internal storage device or portable data storage device using known data erasure techniques. In other examples, the UAV may use degaussing or other techniques for physical destruction to prevent unauthorized to the user data.

At step 306, the drone management server 120 may control the UAV to a data center to back up the obtained user data onto a cloud storage. According to one exemplary aspect, the UAV controlled by the drone management server 120 may be part of a sequence of UAVs. In such aspects, the drone management server 120 may control a first UAV to obtain user data from the user device 102, then transfer the user data to a next UAV in the sequence of UAVs. That UAV then transfers the user data to a next UAV in the sequence, and so forth, until a last UAV in the sequence of UAVs is able to transfer the obtained user data to the data center for back up.

Figure 4:
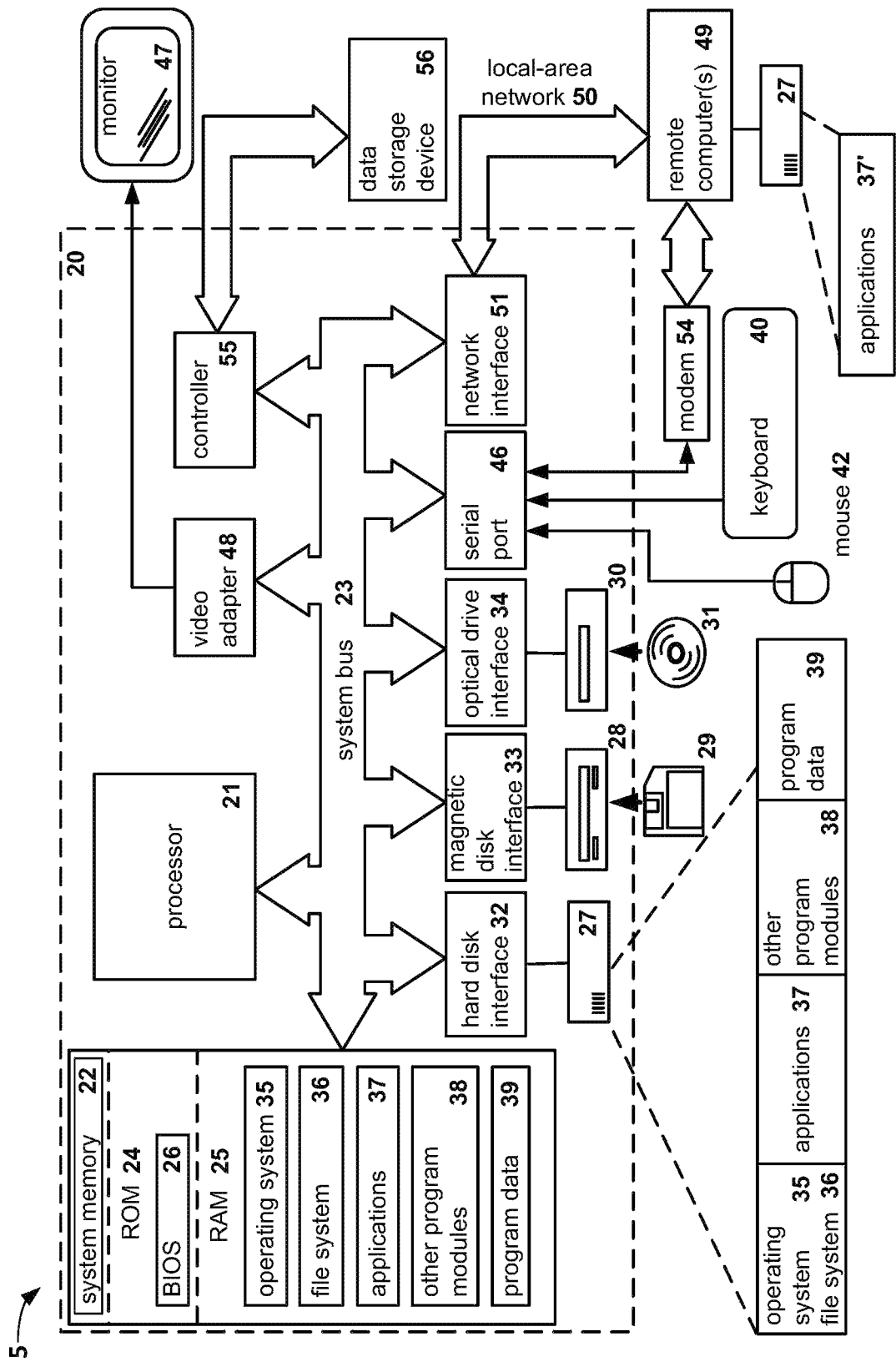
FIG. 4 is a diagram illustrating an example general-purpose computer system on which the systems and methods for performing data backup using an UAV may be implemented.

FIG. 4 depicts one example aspect of a computer system 5 that may be used to implement the disclosed system and method for performing data backup. The computer system 5, which may corresponds to the user device 102 or the drone management server 120 in FIG. 1, may include, but not limited to, a personal computer, a notebook, tablet computer, a smart phone, a mobile device, a network server, a router, or other type of processing device.

As shown, computer system 5 may include one or more hardware processors 15, memory 20, one or more hard disk drive(s) 30, optical drive(s) 35, serial port(s) 40, graphics card 45, audio card 50 and network card(s) 55 connected by system bus 10. System bus 10 may be any of several types of bus structures including a memory bus or memory controller, a peripheral bus and a local bus using any of a variety of known bus architectures. Processor 15 may include one or more Intel® Core 2 Quad 2.33 GHz processors or other type of microprocessor.

System memory 20 may include a read-only memory (ROM) 21 and random access memory (RAM) 23. Memory 20 may be implemented as in DRAM (dynamic RAM), EPROM, EEPROM, Flash or other type of memory architecture. ROM 21 stores a basic input/output system 22 (BIOS), containing the basic routines that help to transfer information between the modules of computer system 5, such as during start-up. RAM 23 stores operating system 24 (OS), such as Windows® 7 Professional or other type of operating system, that is responsible for management and coordination of processes and allocation and sharing of hardware resources in computer system 5. Memory 20 also stores applications and programs 25. Memory 20 also stores various runtime data 26 used by programs 25.

Computer system 5 may further include hard disk drive(s) 30, such as SATA HDD, and optical disk drive(s) 35 for reading from or writing to a removable optical disk, such as a CD-ROM, DVD-ROM or other optical media. Drives 30 and 35 and their associated computer-readable media provide non-volatile storage of computer readable instructions, data structures, applications and program modules/subroutines that implement algorithms and methods disclosed herein. Although the exemplary computer system 5 employs magnetic and optical disks, it should be appreciated by those skilled in the art that other types of computer readable media that can store data accessible by a computer system 5, such as magnetic cassettes, flash memory cards, digital video disks, RAMs, ROMs, EPROMs and other types of memory may also be used in alternative aspects of the computer system 5.

Computer system 5 further includes a plurality of serial ports 40, such as Universal Serial Bus (USB), for connecting data input device(s) 75, such as keyboard, mouse, touch pad and other. Serial ports 40 may be also be used to connect data output device(s) 80, such as printer, scanner and other, as well as other peripheral device(s) 85, such as external data storage devices and the like. System 5 may also include graphics card 45, such as nVidia® GeForce® GT 240M or other video card, for interfacing with a display 60 or other video reproduction device, such as touch-screen display. System 5 may also include an audio card 50 for reproducing sound via internal or external speakers 65. In addition, system 5 may include network card(s) 55, such as Ethernet, WiFi, GSM, Bluetooth or other wired, wireless, or cellular network interface for connecting computer system 5 to network 70, such as the Internet.

In various aspects, the systems and methods described herein may be implemented in hardware, software, firmware, or any combination thereof. If implemented in software, the methods may be stored as one or more instructions or code on a non-transitory computer-readable medium. Computer-readable medium includes data storage. By way of example, and not limitation, such computer-readable medium can comprise RAM, ROM, EEPROM, CD-ROM, Flash memory or other types of electric, magnetic, or optical storage medium, or any other medium that can be used to carry or store desired program code in the form of instructions or data structures and that can be accessed by a processor of a general purpose computer.

The terms "component" and "module" as used herein mean a real-world device, apparatus, or arrangement of components or modules implemented using hardware, such as by an application specific integrated circuit (ASIC) or field-programmable gate array (FPGA), for example, or as a combination of hardware and software, such as by a microprocessor system and a set of instructions to implement the module's functionality, which (while being executed) transform the microprocessor system into a special-purpose device. A component or module can also be implemented as a combination of the two, with certain functions facilitated by hardware alone, and other functions facilitated by a combination of hardware and software. In certain implementations, at least a portion, and in some cases, all, of a module can be executed on the processor of a general purpose computer. Accordingly, each component or module can be realized in a variety of suitable configurations, and should not be limited to any particular implementation exemplified herein.

In the interest of clarity, not all of the routine features of the aspects are disclosed herein. It will be appreciated that in the development of any actual implementation of the invention, numerous implementation-specific decisions must be made in order to achieve the developer's specific goals, and that these specific goals will vary for different implementations and different developers. It will be appreciated that such a development effort might be complex and time-consuming, but would nevertheless be a routine undertaking of engineering for those of ordinary skill in the art having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method for performing data backup of a user device to a data center, the method comprising:
   in response to detecting a data backup request from a user device:
      determining a geographic location of the user device;
      determining a network connectivity metric between the user device and the data center; and
      dispatching one unmanned aerial vehicle (UAV) in a sequence of UAVs to the geographic location responsive to determining that the network connectivity metric between the user device and the data center does not meet a threshold connectivity;
   controlling the one UAV to obtain user data from the user device, wherein the obtained user data comprises an initial full backup of the user device;
   controlling the one UAV to navigate to the data center to copy the obtained user data onto a cloud storage by:
      controlling the one UAV in the sequence of UAVs to transfer the obtained user data to a next UAV in the sequence of UAVs in a sequential manner, until a last UAV in the sequence of UAVs transfers the obtained user data to the data center.

2. The method of claim 1, wherein controlling the one UAV to obtain user data includes one of:
   storing the user data on a portable data storage media;
   uploading the user data onto internal data storage of the one UAV using a wireless network connection between the user device and the one UAV.

3. The method of claim 1, wherein controlling the one UAV to obtain user data includes: compressing and encrypting the user data.

4. The method of claim 1, wherein controlling the one UAV to obtain the user data comprise:
   determining flying trajectory and path for the one UAV in connection with the geographic location;
   controlling a landing of the one UAV by hovering the one UAV at a selected altitude above the geographic location; and
   controlling a winch of the one UAV for access to the user device located below the one UAV.

5. The method of claim 1, wherein controlling the one UAV to obtain the user data comprise:
   using at least one vehicle for transporting the one UAV towards the geographic location; and
   launching the one UAV from the at least one vehicle responsive to the at least one vehicle reaching a defined range of the geographic location.

6. The method of claim 1, further comprising:
   generating an alert on a selected user device for indicating the one UAV approaching the geographic location.

7. The method of claim 1, further comprising:
   generating a guidance target with a barcode to guide the one UAV to the geographic location.

8. The method of claim 1, further comprising:
   directing the UAV to destroy the obtained user data responsive to detecting at least one of unauthorized access to the UAV or electromechanical failure of the UAV.

9. The method of claim 1, wherein the network connectivity metric is latency and wherein determining that the network connectivity metric between the user device and the data center does not meet a threshold connectivity comprises determining that the latency between the user device and the data center exceeds a pre-determined latency threshold.

10. An unmanned aerial vehicle (UAV) comprising:
    a memory; and
    a hardware processor coupled to the memory and being configured to:
       responsive to receiving a geographic location of a user device requesting data backup, move the UAV to the geographic location, wherein the geographic location is received responsive to a determination that a network connectivity metric between the user device and a data center that provides data backup does not meet a threshold connectivity;
       obtain and store user data from the user device in the UAV, wherein the obtained user data comprises an initial full backup of the user device; and
       control the UAV to transfer the obtained user data to a sequence of UAVs comprising at least one next UAV that receives and transfers the obtained user data in a sequential manner, until a last UAV in the sequence of UAVs receives and transfers the obtained user data to the data center to copy the obtained user data onto a cloud storage.

11. The unmanned aerial vehicle of claim 10, wherein the processor configured to obtain and store user data from the user device in the UAV is further configured to:
    store the user data on a portable data storage media physically retained by the UAV.

12. The unmanned aerial vehicle of claim 10, wherein the processor configured to obtain and store user data from the user device in the UAV is further configured to:
    upload the user data onto the memory of the UAV using a wireless network connection between the user device and the UAV.

13. The unmanned aerial vehicle of claim 10, further comprising:
    a winch device configured to enable ground access to the UAV from an elevated position;
    wherein the processor is configured to hover the UAV at a selected altitude above the received geographical location and operate the winch device for ground access to the user device below the UAV.

14. The unmanned aerial vehicle of claim 10, wherein the UAV is configured to launch from a base vehicle responsive to reaching a defined range of the geographic location, wherein the base vehicle is configured for transporting the UAV towards the geographic location.

15. The unmanned aerial vehicle of claim 10, further comprising:
a camera configured to capture imagery of a guidance target with a barcode; wherein the processor is further configured to guide the UAV to a landing based on the barcode.

16. The unmanned aerial vehicle of claim 10, wherein the processor is further configured to:
destroy the obtained user data responsive to detecting at least one of unauthorized access to the UAV or electromechanical failure of the UAV.

17. A non-transitory computer readable medium comprising computer executable instructions for performing data backup of a user device to a data center, including instructions for:
in response to detecting a data backup request from a user device:
determining a geographic location of the user device;
determining a network connectivity metric between the user device and the data center; and
dispatching one unmanned aerial vehicle (UAV) in a sequence of UAVs to the geographic location responsive to determining that the network connectivity metric between the user device and the data center does not meet a threshold connectivity;
controlling the one UAV to obtain user data from the user device, wherein the obtained user data comprises an initial full backup of the user device;
control the one UAV to navigate to the data center to copy the obtained user data onto a cloud storage; by:
controlling the one UAV in the sequence of UAVs to transfer the obtained user data to a next UAV in the sequence of UAVs in a sequential manner, until a last UAV in the sequence of UAVs transfers the obtained user data to the data center.

18. The non-transitory computer readable medium of claim 17, wherein instructions for wherein controlling the one UAV to obtain user data includes one of instructions for:
storing the user data on a portable data storage media; and
uploading the user data onto internal data storage of the one UAV using a wireless network connection between the user device and the one UAV.

* * * * *